(12) United States Patent
Khamar

(10) Patent No.: US 7,894,384 B2
(45) Date of Patent: Feb. 22, 2011

(54) PACKET DATA LOAD GENERATOR SYSTEM FOR 1x-EVDO WIRELESS NETWORK

(75) Inventor: Kalpit K. Khamar, Edison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 879 days.

(21) Appl. No.: 11/731,335

(22) Filed: Mar. 31, 2007

(65) Prior Publication Data

US 2008/0240044 A1    Oct. 2, 2008

(51) Int. Cl.
*H04W 4/00* (2009.01)
*G06F 13/20* (2006.01)
*G06F 13/36* (2006.01)

(52) U.S. Cl. .................. 370/328; 710/313; 710/315

(58) Field of Classification Search .......... 370/328; 710/313, 315
See application file for complete search history.

(56) References Cited

U.S. PATENT DOCUMENTS

| 7,602,743 | B2 * | 10/2009 | Tang et al. | 370/316 |
| 2004/0114510 | A1 * | 6/2004 | Miller et al. | 370/217 |

FOREIGN PATENT DOCUMENTS

KR    2003094973 A  * 12/2003

OTHER PUBLICATIONS

Kim J., KR 2003-009497. English Translation. (Dec. 18, 2003).*

* cited by examiner

*Primary Examiner*—Marivelisse Santiago-Cordero
(74) *Attorney, Agent, or Firm*—McCormick, Paulding & Huber LLP

(57) ABSTRACT

A packet data load generator (PDLG) system, and method for testing the PDLG system, includes a Linux-based computer terminal having multiple 1x-EVDO wireless interface cards, e.g., Sierra Wireless AirCards®, directly interfaced therewith. PCI-to-PCMCIA adapter cards are used for connecting the wireless cards to the terminal. The terminal also includes a Linux control program for controlling the multiple wireless cards on a single terminal. In operation, the wireless interface cards are controlled to establish multiple simultaneous 1x-EVDO calls between the terminal and a 1x-EVDO wireless network, e.g., each wireless interface card supports one call with the network. Packet data is transferred between the terminal and the network, in effect simulating a multiple 1x-EVDO call load on the network. PDLG software in place on the network is monitored and/or tested. Multiple similarly configured terminals may be provided for a large number of 1x-EVDO calls, e.g., 40-50, in a laboratory setting.

7 Claims, 4 Drawing Sheets

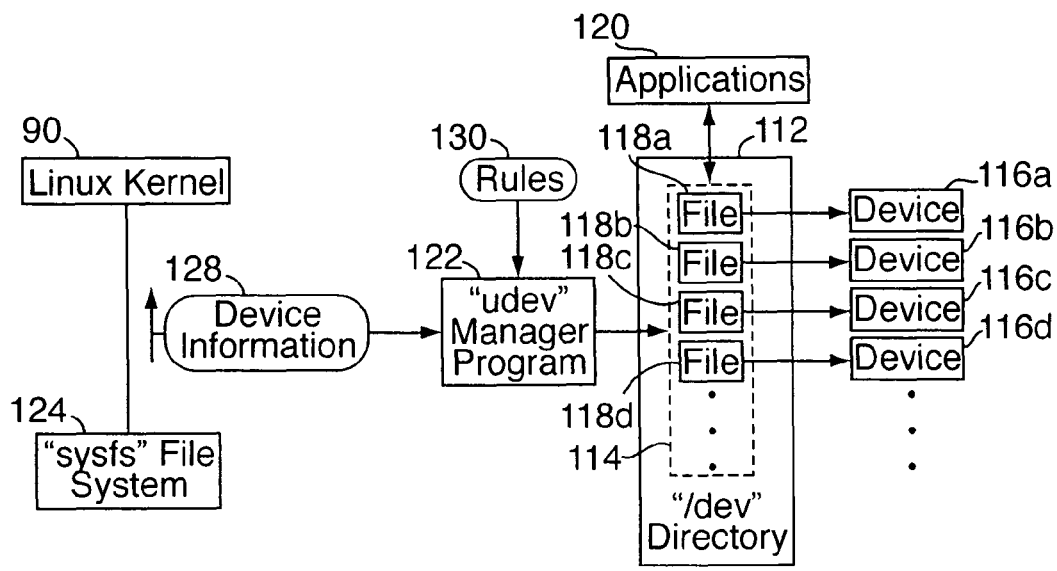
FIG. 5
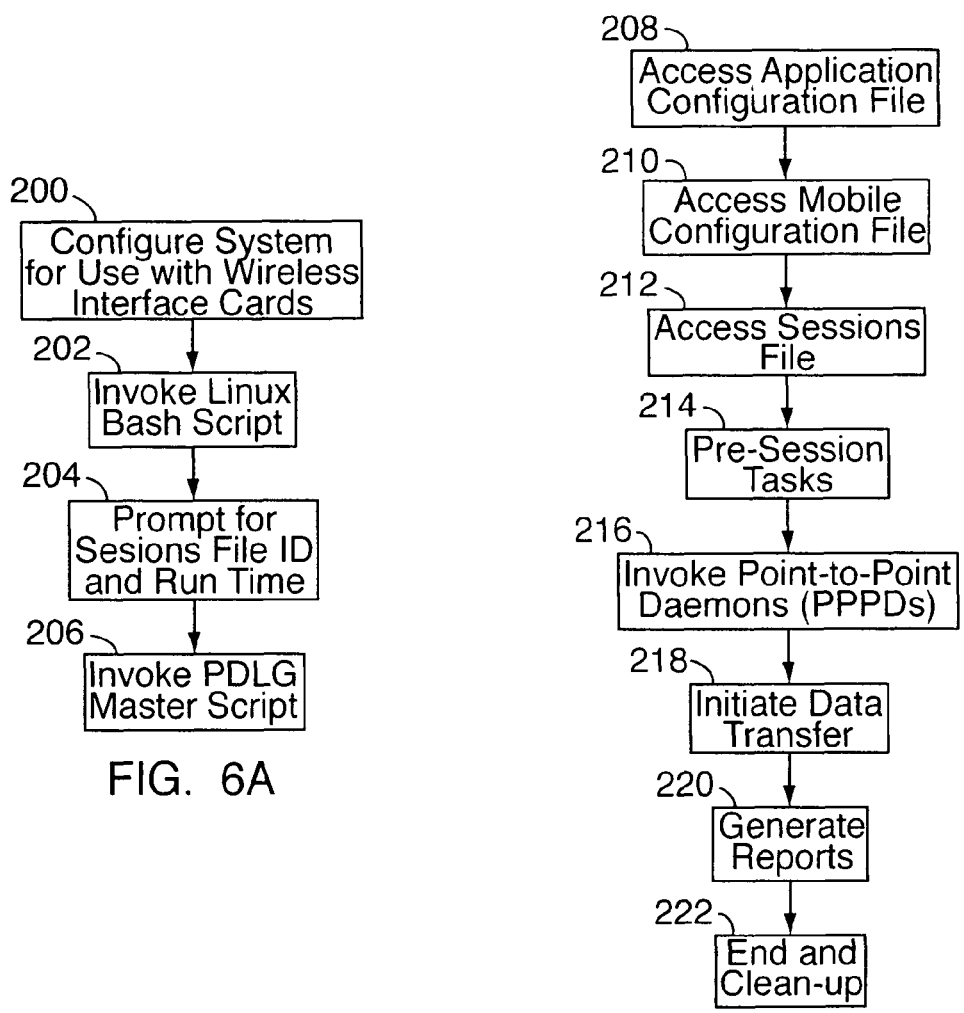
FIG. 6A
FIG. 6B

PACKET DATA LOAD GENERATOR SYSTEM FOR 1x-EVDO WIRELESS NETWORK

FIELD OF THE INVENTION

The present invention relates to communications and, more particularly, to wireless communication systems.

BACKGROUND OF THE INVENTION

Wireless, radio frequency communication systems enable people to communicate with one another over long distances without having to access landline-connected devices such as conventional telephones. While early systems were primarily configured for voice communications, technological improvements have enabled the development of "3-G" (third generation) and similar wireless networks for both voice and high-speed packet data transfer. For example, CDMA-based, "1x-EVDO" (Evolution Data Optimized) wireless communication networks, now implemented in many parts of the U.S. and elsewhere, use the CDMA2000® 3-G mobile telecommunications protocol/specification for the high-speed wireless transmission of both voice and non-voice data. A typical 1x-EVDO wireless network 10 is shown in simplified form in FIG. 1. The network 10 includes one or more fixed base stations 12 having various transceivers and antennae for wireless communications with a number of distributed wireless units such as mobile phones 14a and wireless-equipped portable computer terminals 14b, e.g., laptop computers. For conducting wireless communications between the base stations 12 and the wireless units 14a, 14b, the network 10 utilizes a CDMA (code division multiple access) spread-spectrum multiplexing scheme. In CDMA-based networks, transmissions from wireless units to base stations are across a single frequency bandwidth known as the reverse link 16, e.g., a 1.25 MHz or greater bandwidth centered at a first designated frequency. Generally, each wireless unit 14a, 14b is allocated the entire bandwidth all the time, with the signals from individual wireless units being differentiated from one another using an encoding scheme. Transmissions from base stations to wireless units are across a similar frequency bandwidth (e.g., a 1.25 MHz or greater bandwidth centered at a second designated frequency) known as the forward link 18. The forward and reverse links may each comprise a number of traffic channels and signaling or control channels, the former primarily for carrying voice data, and the latter primarily for carrying the control, synchronization, and other signals required for implementing CDMA communications. Under 1x-EVDO, the network 10 also utilizes another radio channel 20 (e.g., a third 1.25 MHz or greater frequency bandwidth) dedicated to carrying high-speed packet data, with forward data rates up to 3.1 Mbit/s and reverse rates up to 1.8 Mbit/s. The network 10 may be geographically divided into contiguous cells, each serviced by a base station, and/or into sectors, which are portions of a cell typically serviced by different antennae/receivers supported on a single base station.

For high-speed packet data communications over the 1x-EVDO data channel 20, a laptop terminal 14b, for example, will typically be provided with a 1x-EVDO wireless interface card 22, e.g., a miniaturized 1x-EVDO transceiver/chipset, antenna, and computer interface. For example, the wireless interface card 22 may be configured as a PCMCIA card for insertion into a PCMCIA card expansion slot 24 of the laptop. One example of this type of 1x-EVDO wireless interface card is the AirCard® brand from Sierra Wireless. A driver program 26 is provided along with the wireless interface card 22 for controlling the interface card 22 for data transfer over the 1x-EVDO airlink 20. Typical driver programs 26 are compatible with the Microsoft Windows® operating system 28, and support a single laptop computer 14b. For wirelessly transferring data in ongoing operations, e.g., downloading a large file from the Internet 30 to the laptop 14b, the driver 26 controls the interface card 22 in a standard manner to open a communication link between the laptop 14b and the wireless network 10. Depending on the particular characteristics of the wireless network 10 and interface card 22, the link may be "always on." Data addressed to the interface card 22/laptop 14b is sent in packet form from the Internet 30, possibly through a security firewall 32 of the network 10, through a core IP or other packet data network 34 portion of the network 10, and to a packet data serving node ("PDSN") 36. From the PDSN 36, the packet data is routed to a packet control function ("PCF") 38 in place on a radio network controller ("RNC") 40, which manages the relay of data packets between the PDSN 36 and base stations 12. (As should be appreciated, if the network 10 has more than one RNC, the data addressed to the laptop terminal 14b is sent to the RNC 40 that is linked to the base station 12 in communication with the laptop 14b.) The packet data is sent from the PCF 38 to the base station 12 for transmission to the laptop 14b. The network side may include packet data load generator ("PDLG") server software 42 for generating data packets for transmission over the air interface 16, 18, 20. Correspondingly, the terminals 14a, 14b will include PDLG client software 43 for receiving 1x-EVDO data packets, which may be part of the driver program 26.

The PDLG server software 42 is used to generate packet data transmissions. Originally, PDLG software was designed to support CDMA "3G-1x" mobile phones. (3G-1x was an early third-generation technology featuring data transmissions of up to 153 kbps on both the forward and reverse links.) In 2001, when 1x-EVDO was introduced (1x-EVDO was originally called "HDR," which stood for high data rate), the PDLG software was modified to support 1x-EVDO access terminals for generating data call load on 1x-EVDO base stations. By the beginning of 2002, the PDLG software was able to support "Hornet" and "Chester" access terminals, both of which were early 3-G 1x-EVDO access terminal prototypes. In the same year Sierra Wireless introduced the first commercial access terminal, called the AirCard® 575, to support high-speed data calls over the 1x EV-DO network. The PDLG software was revised to support the AirCard® 575.

To test PDLG software 42, it is typically the case that the software is set up and executed in a test environment (e.g., a testing lab) that mimics the actual wireless operating environment, including carrying out multiple calls/transmissions at one time. Thus, the PDLG software 42 is tested in use with a plurality of actual AirCards®, each of which requires a separate laptop terminal 14b to support a single call. Also, the AirCard® driver program 26 only works with the Microsoft Windows® operating system 28, and supports only one AirCard® per laptop. Because of these factors, 1x-EVDO testing facilities are unreliable and expensive to build.

In particular, FIG. 2 shows an existing test facility 44. The facility 44 includes a PDLG client terminal 46 (running Linux), which has multiple network interfaces 48a-48c. One interface 48a is connected to the wireless network 50 (or possibly to an internal network), while the other interfaces 48b, 48c are connected to network interconnection hubs 52a, 52b. For example, each hub 52a, 52b may be a 24-port hub, with one of the ports being connected to the PDLG client terminal and the other 23 ports being respectively connected to a plurality of laptops 54a-54g, each of which is used for supporting a single call/communication. Thus, by using two 24-port hubs and one 4-port hub, it is possible to connect 48 laptops 54a-54g to the PDLG client terminal 46 for testing operation of the PDLG software in the context of 48 simultaneous 1x-EVDO calls. Each laptop 54a-54g includes a network interface 56 or the like, an expansion slot 58 for receiving a PCMCIA card, and an AirCard® 60 (with a PCMCIA connector) connected to the laptop via the expansion slot 58. Similar to as shown in FIG. 1, each laptop 54a-54g runs the Windows® operating system 28 and includes a Windows®-based AirCard® driver program 26. Each AirCard® 60 is connected to the RF interface 62 of the network 50, either wirelessly using the AirCard®'s built-in antenna or via an RF feed cable attached to the AirCard®'s antenna input. The RF interface 62 may be an actual base station, or it may be a transceiver system for simulating the operation of a base station. The laptops 54a-54g, hubs 52a, 52b, and one or more electric fan units 64 are housed in a storage cabinet 66. In operation, a PDLG script 68 is run on the PDLG client terminal 46 to generate the call load on one or more of the laptops 54a-54g. Once the calls are established on the laptops 54a-54g, data is moved between the laptops 54a-54g and a PDLG server terminal 70 located on the PDSN side of the network 50.

Considering the large number of laptop terminals 54a-54g, AirCards® 60, and support components (e.g., fan units 64 and hubs 52a, 52b), as well as the cabinet 66, test facilities 44 are very expensive and time consuming to set up and operate. For example, to build one fully loaded cabinet 66 with forty-eight laptops may cost as much as $70,000. Also, it may involve two to three persons working for up to two weeks to build the physical cabinet and two persons working for two to three weeks to install and configure the laptop terminals 54a-54g and the PDLG client terminal 46. System reliability issues are also a problem, including laptop terminal lock-up due to over heating, computer virus infection exacerbated through the use of the Windows® operating system 28, incompatibility problems between the AirCard® drivers 26 and Windows® 28, and that maintaining hundreds of laptop terminals is very time consuming and prone to error.

SUMMARY OF THE INVENTION

An embodiment of the present invention relates to a packet data load generator ("PDLG") system for a 1x-EVDO wireless communication network, and to a method for communicating over the network, e.g., for testing the PDLG system. Initially, a plurality of discrete communication links are established between a single terminal and the wireless network using a plurality of wireless units connected to the terminal. By "discrete," it is meant that each wireless unit establishes a logically separate and distinguishable communication channel for transferring one or more separate data streams. Then, packet data is transferred between the terminal and wireless network over the communication links. The wireless units are electronic devices configured for transmitting and receiving data over a radio-frequency (RF) communication link. The terminal may be a computer terminal or other processor-based electronic device configured to control the wireless units for transmitting and receiving data. The wireless units are directly interfaced with the terminal, meaning that no other general-purpose processor-based devices are interposed between the terminal and wireless units and/or required for operating the wireless units.

In another embodiment, thereby, the single terminal (with the plurality of wireless units connected thereto) obviates the need to provide a large number of laptop or other computer terminals for operating the wireless units. The operation of a PDLG in place on the network (e.g., at a base station) may be monitored while packet data is being transferred to and from the terminal over the communication links. As should be appreciated, the communication links simulate a plurality of separate calls over the wireless network. Operation of the PDLG is monitored in regards to the plurality of simulated calls, for testing purposes.

In another embodiment, the method is used for communications over a 1x-EVDO wireless network. In such a case, the communication links are 1x-EVDO data channels, and the wireless units are 1x-EVDO wireless interface cards such as Sierra Wireless AirCards®.

In another embodiment, the system includes two or more computer terminals each having a number of wireless units directly interfaced therewith. For example, each terminal may have up to ten wireless units attached to the terminal's local bus, e.g., a PCI bus. The terminals are used to simulate a large number of wireless network calls/communications, for testing operation of the PDLG in "real world" conditions.

BRIEF DESCRIPTION OF THE DRAWINGS

The present invention will be better understood from reading the following description of non-limiting embodiments, with reference to the attached drawings, wherein below:

FIG. 5 is a schematic diagram of the peripheral device control structure in a Linux system; and FIGS. 6A and 6B are flowcharts showing operation of a Linux kernel control program portion of the system shown in FIGS. 3 and 4.

DETAILED DESCRIPTION

Figure 1:
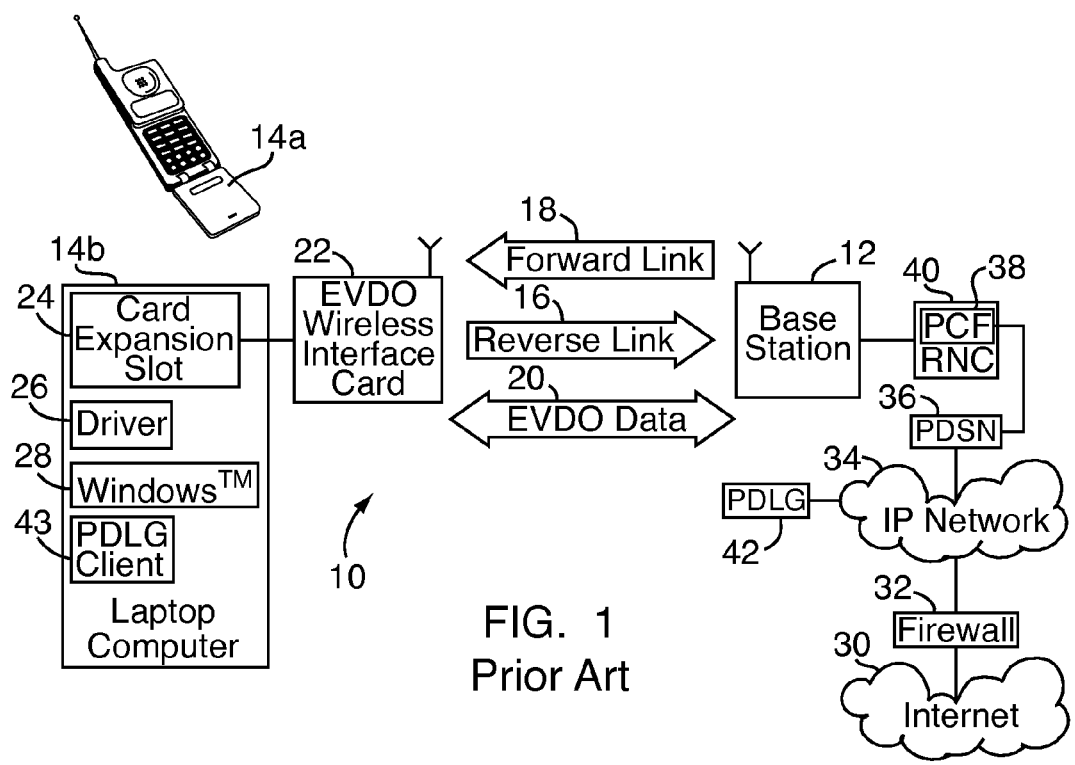
FIG. 1 is a schematic diagram of a 1x-EVDO wireless network.

With reference to FIGS. 1 and 3-6B, various embodiments of a packet data load generator ("PDLG") system 80 and a method for communicating over a network, e.g., for testing the PDLG system, are implemented on or as part of a wireless communication network 10, e.g., a CDMA-based 1x-EVDO network or other wireless network. The system includes a client terminal 82 (e.g., a computer terminal or other processor-based device) having one or more built-in card expansion slots 84, e.g., one or more standard PCI expansion slots. A number of wireless units, e.g., 1x-EVDO capable wireless interface cards 86a-86c, are directly connected to the card expansion slot(s) 84, that is, there are no other general-purpose processor-based devices disposed between the interface cards 86a-86c and terminal 82 and/or required for operating the wireless interface cards 86a-86c. Each wireless interface card 86a-86c is a transceiver-equipped device configured for carrying out RF communications, for transferring data over a 1x-EVDO channel 20 or the like between the terminal 82 and the wireless network 10. The terminal 82 may include a standard network interface card 88 for connecting the terminal 82 to the wireless network 10. Also, the terminal 82 may run the Linux operating system 90 in conjunction with a Linux-based PDLG control program 92 for controlling the wireless interface cards 86a-86c. The control program 92 supports the use of multiple wireless interface cards 86a-86c and multiple simultaneous calls/communication links on a single terminal 82.

In operation, the control program 92 controls the 1x-EVDO wireless interface cards 86a-86c to establish a discrete communication link between each card 86a-86c and the wireless network 10, over the RF interface 62 of the wireless network 10. In effect, the wireless interface cards 86a-86c are controlled to mimic a plurality of simultaneous 1x-EVDO calls/data links on the wireless network 10, just as if a number of individual users were accessing the network 10 for separate and discreet 1x-EVDO communications such as downloading large files from the Internet. Packet data or other data is transferred between the terminal 82 and the wireless network 10 using the wireless interface cards 86a-86c. As the data is being transferred (simulating a number of simultaneous 1x-EVDO calls on the network), a PDLG 42 in place on the network (e.g., at a base station, a PDLG server terminal 70, or elsewhere) may be monitored to test its operation on the network.

As should be appreciated, because multiple wireless interface cards 86a-86c are directly interfaced with the client terminal 82, and with the control program 92 being configured to control the multiple wireless interface cards 86a-86c for establishing and/or maintaining a number of simultaneous calls/communications links with the network 10, there is no longer a need to provide a separate laptop or other terminal for each wireless interface card 86a-86c. Thus, the need for cabinets, fan units, hubs, and the like is eliminated, as is the need to setup and maintain the multiplicity of laptops. Additionally, because the control program 92 is a Linux-based program, with the terminal 82 running Linux as its operating system, the system 80 is much more reliable, especially in terms of virus protection, than a system that uses Microsoft Windows®.

Figure 4:
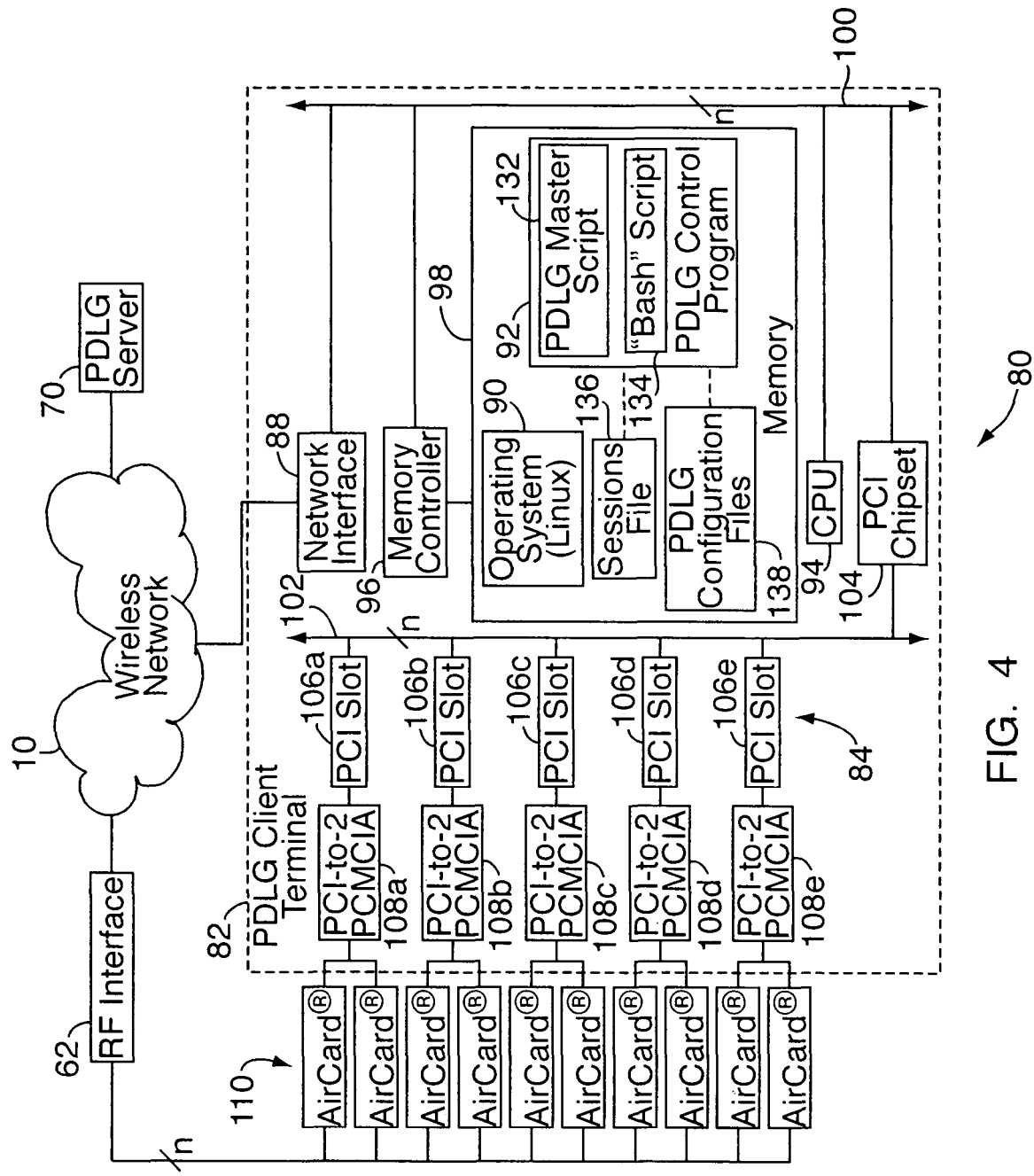

FIG. 4 shows an embodiment of the system 80 in more detail. As indicated, the client terminal 82 will typically include, as standard components, a central processing unit (CPU) 94, a memory controller 96, and memory 98 (e.g., RAM, ROM, and/or mass storage), all interconnected via a first local bus 100, e.g., a processor bus. The operating system (e.g., Linux) 90 and Linux-based PDLG control program 92 may be stored in the memory 98 for execution by the CPU 94 in a standard manner. The processor bus 100 is connected to a second local bus 102, e.g., a PCI bus, via a PCI chipset/controller 104. A number of PCI expansion slots 106a-106e are connected to the PCI bus 102 for quickly physically and electrically attaching PCI-based expansion cards/modules to the terminal 82. (Five slots 106a-106e are shown in FIG. 4, which is a typical number for a desktop personal computer.) Each PCI expansion slot 106a-106e has a PCI-to-twin-PCMCIA adapter 108a-108e attached thereto, respectively. Each adapter 108a-108e includes a PCI connector for connecting the adapter to a PCI slot 106a-106e and two PCMCIA slots electrically connected to the PCI connector for attaching two PCMCIA expansion cards. (In other words, the adapters 106a-106e effectively convert each PCI slot to two PCMCIA slots.) The adapters 108a-108e may be, for example, Elan Digital™ twin rear slot universal PCI-to-PCMCIA adapters such as the model number P222. A wireless interface card 110 is connected to each PCMCIA slot, with each adapter 108a-108e (and thereby each PCI slot 106a-106e) carrying two wireless interface cards. Thus, as shown in FIG. 4, the terminal 82 has a total of ten wireless interface cards 110 attached thereto. The wireless interface cards 110 may be, for example, 1x-EVDO wireless interface cards such as the Sierra Wireless AirCard® 580 (also marketed as the Audiovox/Verizon Wireless PC 5220). The wireless interface cards 110 may be configured for wireless RF communications using built-in antennae, or in a lab setting they may be connected to the RF interface 62 of the network 10 using coaxial cables or other types of RF feed cables. As such, any references herein to "wireless" communications refers more broadly to RF communications generally.

Figure 3:
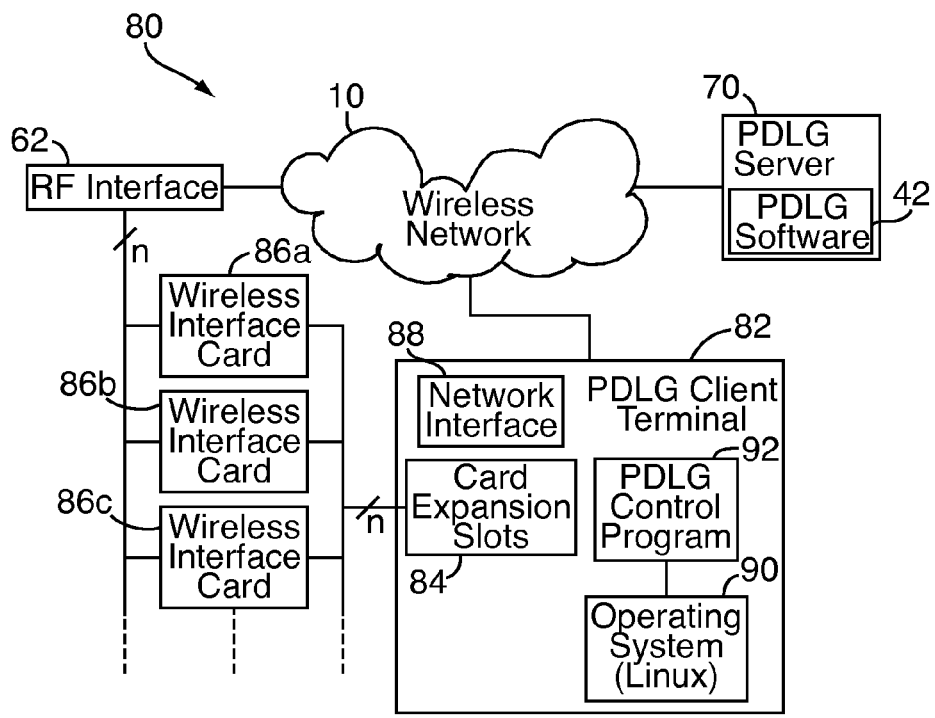
FIGS. 3 and 4 are schematic diagrams of a system for testing a PDLG on a 1x-EVDO network, according to various embodiments of the present invention.
Figure 2:
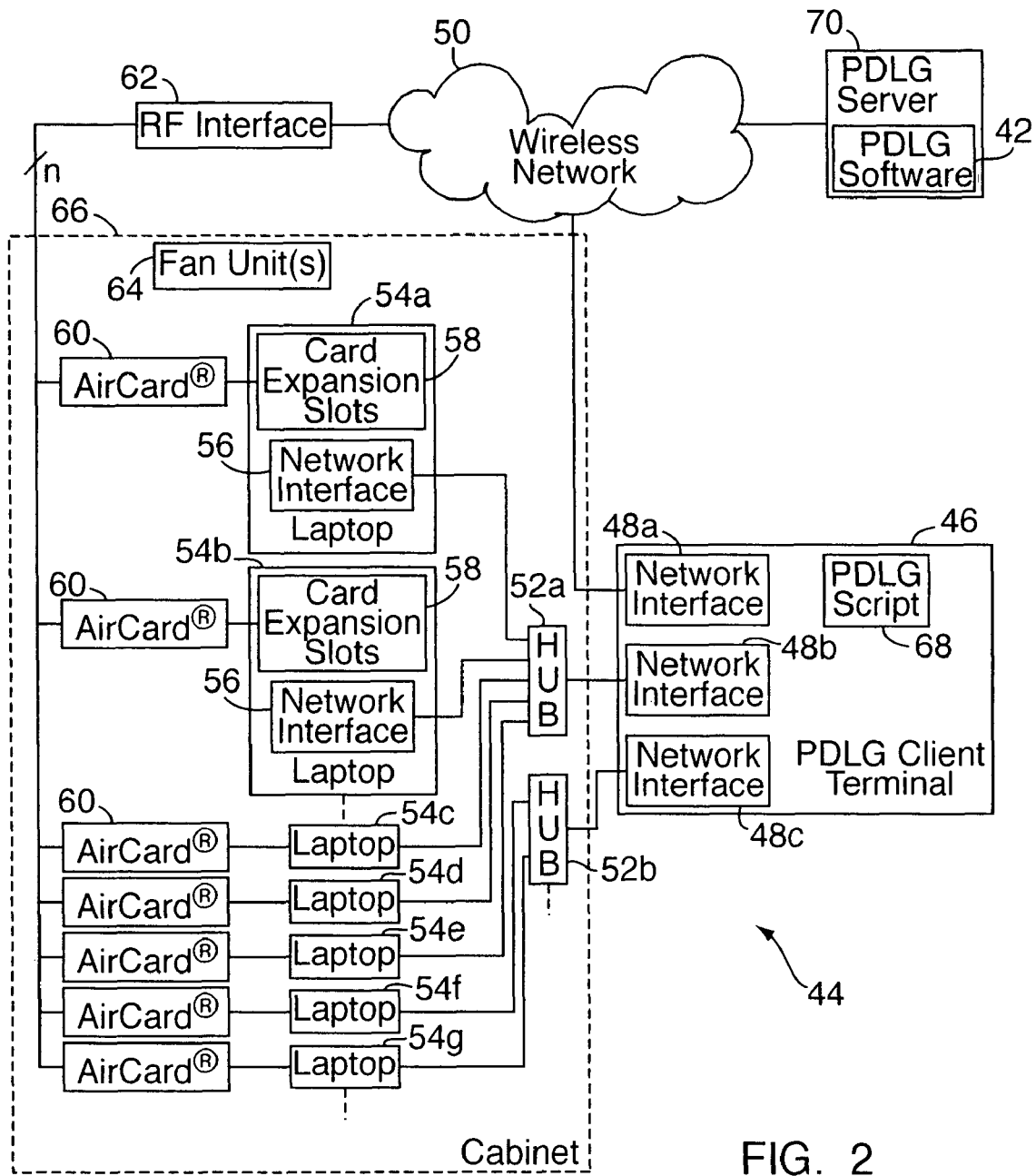
FIG. 2 is a schematic diagram of a system for communicating over a 1x-EVDO network, including testing operation of a packet data load generator (PDLG), according to the prior art.

The system 80 shown in FIG. 4 works similarly to the system shown in FIG. 3. The CPU 94 and Linux operating system 90 execute the control program 92 in a standard manner. The control program 92 controls the wireless interface cards 110 directly through the PCI/PCMCIA slots to establish a number of discrete 1x-EVDO communication links between the terminal 82 and the wireless network 10, e.g., there is one 1x-EVDO communication link between each wireless interface card 110 and the wireless network 10. (In the system as illustrated in FIG. 4 there would be up to 10 simultaneous discreet communication links.) Packet data is transferred between the terminal 82 and the wireless network 10 over the various communication links, in effect simulating a plurality of 1x-EVDO calls. (More specifically, the transmissions are actual 1x-EVDO calls, but simulate the situation of a number of different users simultaneously accessing the network for separate 1x-EVDO calls.) As the data is transferred, PDLG software on the network 10 is monitored/tested, e.g., for determining how the PDLG software functions with respect to a plurality of 1x-EVDO calls.

For a PDLG testing laboratory, it will typically be the case that a large number of 1x-EVDO communication links are required for simulating actual network conditions. For example, forty to fifty links may be required. If a single terminal 82 has enough PCI slots, or if the PCI-to-PCMCIA adapters 108a-108e each have more than two PCMCIA slots, a single terminal may be suitable for the system. Otherwise, four or five terminals configured as shown in FIG. 4 may be provided, each carrying ten wireless interface cards 110, for a total of 40-50 wireless interface cards. As should be appreciated, coordination between the terminals 82 is not required since each wireless interface card 110 is controlled to establish a discreet communication link—a greater number of terminals and wireless interface cards simply increases the available potential call load.

As noted, the PDLG control program 92 is configured to control multiple wireless interface cards 110, through their direct connection to the local buses 100, 102 by way of the PCI/PCMCIA slots, for establishing multiple 1x-EVDO calls from the single computer terminal 82. Operation of the control program 92 will be further explained herein for the system configuration where each wireless interface card 110 is a Sierra Wireless AirCard® 580. However, control programs 92 can be easily adapted for controlling different types of wireless interface cards using standard programming methods.

FIG. 5, provided for background information, conceptually illustrates (in part) how Linux interacts with peripheral devices. On typical Linux-based systems, a "/dev" directory 112 is used to store file-like device "nodes" 114 which respectively refer to certain devices 116a-116d in the system. Each node file 118a-118d points to a part of the system (e.g., a device), which might or might not be currently connected to the system/terminal. User-level applications 120 use the device nodes 114 to interface with the devices 116a-116d, for example, an application program may "listen to" a "/dev/input/mice" node so that it can relate the user's mouse movements to moving the visual mouse pointer. The Linux system also includes a "udev" manager program 122 that manages the "/dev" directory 112, and a "sysfs" file system 124, which is managed by the Linux kernel 92. The file system 124 generates basic information 128 about the devices 116a-116c currently connected to the system. The manager program 122 uses the device information 128 to create and name the device nodes 114 that correspond to the devices 116a-116b present in the system. For this purpose, the manager program 122 may match the information 128 provided by the file system 124 with default and/or user-generated rules 130. (Older versions of Linux use the "devfs" manager program, which provides functionality similar to that of "udev" but without user-defined rules or other control.)

Each wireless interface card 110 (e.g., AirCard® 580) includes an internal chipset that implements the 1x-EVDO communication functionality. The card internally configures itself as a USB hub that emulates two USB serial devices or ports. The first USB serial port is the "modem," e.g., it provides a serial modem interface that accepts AT commands and PPP data. The second USB serial port is reserved for diagnostics purposes and is unused. When the wireless interface card 110 is attached to a PCI-to-twin-PCMCIA adapter 108a, the Linux file system 124 generates information 128 relating to the USB serial ports emulated by the interface card 110. Based on this information, the manager program 122 generates node files 118a, 118b for the two USB serial ports. Within the context of the PDLG system 80, one of the serial ports is unused, and the other is used to make 1x-EVDO data calls.

As part of the process of configuring the Linux system 90 for controlling the wireless interface cards 110, a device driver is associated with the wireless interface cards 110. Because the wireless interface cards emulate USB serial ports, a generic USB-to-serial driver is typically used, which is registered with the Linux kernel 90. For this, the driver is registered with both a USB-to-serial core/layer portion of the kernel, and with a USB core portion of the kernel 90. (The USB core is a subsystem in the Linux operating system, with a specific application programming interface to support USB devices and host controllers. The USB-to-serial layer acts as an interface or subsystem for accommodating serial port drivers.) Registering with the USB-to-serial core tells it to call the driver when new devices are detected, while registering with the USB core is required for informing it regarding what kind of devices the driver can accept.

To register with the USB core, a list of the USB devices with which the driver functions is entered into the Linux kernel 90, in typical USB device ID format:

```
static struct usb_device_id id_table [ ] = {
    { USB_DEVICE(0x1199, 0x0018) }, /* Sierra Wireless MC5720 */
    { USB_DEVICE(0x1199, 0x0020) }, /* Sierra Wireless MC5725 */
    { USB_DEVICE(0x1199, 0x0017) }, /* Sierra Wireless EM5625 */
    { USB_DEVICE(0x1199, 0x0012) }, /* Sierra Wireless AirCard 580 */
    { USB_DEVICE(0x1199, 0x0019) }, /* Sierra Wireless AirCard 595 */
    { USB_DEVICE(0x1199, 0x6802) }, /* Sierra Wireless MC8755 */
    { USB_DEVICE(0x1199, 0x6803) }, /* Sierra Wireless MC8765 */
    { USB_DEVICE(0x1199, 0x6812) }, /* Sierra Wireless MC8775 */
    { USB_DEVICE(0x1199, 0x6820) }, /* Sierra Wireless AirCard 875 */
    { USB_DEVICE(0xf3d, 0x0112) }, /* AirPrime CDMA Wireless PC Card */
    { USB_DEVICE(0x1410, 0x1110) }, /* Novatel Wireless Merlin CDMA */
    { }
};
MODULE_DEVICE_TABLE(usb, id_table);
```

As should be apparent, this list includes a number of devices other than the Sierra Wireless AirCard® 580. Most of these devices are capable of running 1x-EVDO calls, and, as such, might be used in the system 80.

Subsequently, the USB device-driver structure is created using this ID information:

```
static struct usb_driver sierra_driver = {
    .name       = "sierra",
    .probe      = usb_serial_probe,
    .disconnect = usb_serial_disconnect,
    .id_table   = id_table,
    .no_dynamic_id = 1,
};
```

Then, a simple call registers this driver with the USB core:

usb_register (&sierra_driver);

After this, the USB-to-serial core is notified of the driver with a call to:

usb_serial_register (&sierra_driver);

For disconnecting the wireless interface cards 110, the same steps are carried out, but in reverse order. First, the device driver is de-registered with the USB-to-serial core:

usb_serial_unregister (&sierra_driver);

Then, it is de-registered with the USB core:

usb_unregister (&sierra_driver);

Once the wireless interface cards 110 are connected and set up as described above, a message log (partially reproduced below) will reveal that the devices 110 are identified on the Linux system 90, as follows:

usbserial_generic 6-1:1.0: Generic converter detected usb 6-1: Generic converter now attached to ttyUSB0 usbserial_generic 6-1:1.1: Generic converter detected usb 6-1: Generic converter now attached to ttyUSB1 usbserial_generic 11-1:1.0: Generic converter detected usb 11-1: Generic converter now attached to ttyUSB2 usbserial_generic 11-1:1.1: Generic converter detected usb 11-1: Generic converter now attached to ttyUSB3 usbserial_generic 7-1:1.0: Generic converter detected usb 7-1: Generic converter now attached to ttyUSB4 usbserial_generic 7-1:1.1: Generic converter detected usb 7-1: Generic converter now attached to ttyUSB5 . . . .

usbcore: registered new driver usbserial_generic usbcore: registered new driver usbserial As discussed above, each wireless interface card 110 is recognized as having two USB serial ports. Thus, in the message log above, the first wireless interface card 110 is assigned "ttyUSB0" and "ttyUSB1," with the former being the modem port for making data calls. The message log also indicates that the drivers have been registered.

After setting up the operating system 90 for use with the wireless interface cards 110, the PDLG control program 92 is used to invoke the calls or call load and to transfer data to the wireless cards 110 for transmission. The control program 92 includes a master PDLG script 132 and a bash script 134. (The "bash" script 134 is a program listing that runs on bash, which is the default shell or user interface on most Linux operating systems, i.e., the script 134 is a set of commands recognized by the Linux operating system 90.) The bash script 134 is used to invoke the master PDLG script 132, including obtaining certain data required for operating the PDLG script 132, while the master PDLG script 132 is configured to invoke sessions, establish calls, and transfer data. A sample user-defined script 134, referred to as "xx.pdlg," is shown below:

```
[pdlg@2e1evdo5 ~]$
[pdlg@2e1evdo5 ~]$ pwd
/home/pdlg
[pdlg@2e1evdo5 ~]$ cat xx.pdlg
! /bin/bash
DEF_MIN=5          # Default run minutes
RUNMIN=${1:-$DEF_MIN}
SESSIONS_FILE=sessions      # Default sessions file is "sessions."
TESTDIR=`pwd`/`date +%m%d-%H:%M`
mkdir $TESTDIR
cp $SESSIONS_FILE $TESTDIR
pdlg -sesfile $SESSIONS_FILE -network -logpath $TESTDIR -duration
$RUNMIN -reportfreq 60 2>&1 | tee -i $TESTDIR/cout
```

In the example above, two inputs are taken from the user, "sessions" and "time." The former refers to a session file 136, which defines the data to be transferred and manner of transference, e.g., FTP, HTTP, and/or UDP. The default name for the session file is simply "sessions." The "time" value indicates how long the call load is to be run. The default call load time in this example is 5 minutes. "pdlg" refers to the master PDLG script 132, which is invoked by the bash script 134. As indicated, the bash script 134 passes various values/fields to the PDLG script 132, including the identity of the sessions file, the duration time, and the path for logging data ($TESTDIR).

The following is illustrative of a sample "session" file 136:

```
[pdlg@2e1evdo5 ~]$ cat sessions
# echo -data r -time r -iat r -random -file filename [ -load r ]
#       [ -pksize r ] [ -window n ]

# max -data r -time r -iat r [ -load n ] [ -pksize n ]

# delay_echo -data r -delay r -iat r -random -file filename [ -load n ]
#       [-pksize n ]

# ftp -upload junk_hp [ -iat r ] [ -repeat r ] [ -pksize r ]

# ftp [ -iat r ] [ -download filename ] [ -upload filename ] [ -passive ]

```

-continued

```
##################################################################
(100 (ftp -upload junk_hp -iat 12)) (100 (ftp -download junk_hp -iat 12))
(101 (ftp -upload junk_hp -iat 12)) (101 (ftp -download junk_hp -iat 12))
(102 (ftp -upload junk_hp -iat 12)) (102 (ftp -download junk_hp -iat 12))
(103 (ftp -upload junk_hp -iat 12)) (103 (ftp -download junk_hp -iat 12))
(104 (ftp -upload junk_hp -iat 12)) (104 (ftp -download junk_hp -iat 12))
(105 (ftp -upload junk_hp -iat 12)) (105 (ftp -download junk_hp -iat 12))
(106 (ftp -upload junk_hp -iat 12)) (106 (ftp -download junk_hp -iat 12))
(107 (ftp -upload junk_hp -iat 12)) (167 (ftp -download junk_hp -iat 12))
(108 (ftp -upload junk_hp -iat 12)) (108 (ftp -download junk_hp -iat 12))
(109 (ftp -upload junk_hp -iat 12)) (109 (ftp -download junk_hp -iat 12))
(110 (ftp -upload junk_hp -iat 12)) (110 (ftp -download junk_hp -iat 12))
(111 (ftp -upload junk_hp -iat 12)) (111 (ftp -download junk_hp -iat 12))
```

In this example, there are 12 wireless interface cards indexed as numbers 100-111. Each interface card carries out download and upload operations, in this case FTP file transfers. "Junk_hp" is the file being sent and received.

The functional configuration of the PDLG master script 132 is shown in FIG. 6B, as it interrelates to the operation of the bash script 134 as described above and as shown in FIG. 6A. It is assumed that the wireless interface cards 110 have been connected and the Linux system 90 set up for operation therewith, as described above, as at Step 200.

At Step 202, a user invokes the bash script 134, e.g., by entering an identifier of the script into the Linux bash shell by way of a command line prompt. At Step 204, the bash script 134 is executed by the Linux system 90, including prompting the user for the identity of the sessions file 136 and the time value for how long the call load is to be run. (Default values are used otherwise.) At Step 206, the bash script 134 invokes the PDLG master script 132, including passing the values noted above.

Subsequent to invocation of the PDLG master script 132 by the bash script 134, the PDLG script 132 will typically access one or more configuration files 138, which are stored in one or more designated directories. The configuration files 138 contain information relating to the wireless cards 110 and their interfaces, which is used by the PDLG script 132 for establishing calls and transferring data over the wireless cards 110. Thus, for example, at Step 208 in FIG. 6B the PDLG master script 132 accesses an "application configuration" file, which includes information relating to the PDLG server 70. A sample application configuration file is as follows:

```
[pdlg@2e1evdo5 conf]$ cat conf.apps
#          Application Configuration File

echo        pdlg_echo_client  -type echo     -port 8200
max         pdlg_echo_client  -type max      -port 8201
delay_echo  pdlg_echo_client  -type delay    -port 8202
ping        pdlg_pftp_client  -type ping
ftp         pdlg_ftp_client   -type ftp      -lanserver
                                             ["ip_address.com"]
                              -port 21       -user pdlgftp
                                             -pass pdlgftp
http        pdlg_jhttp_client -port 80
udp         pdlg_judp_client  -controlServer pdlgs08  -controlPort 2200
```

By way of the application configuration file, the user has the privilege to define different data transfer applications, and according to user selection after initiating calls the wireless cards 110 will move data. The applications noted above are supported in current PDLG software.

"Echo Client" has the following format:

(echo{-data r | -time r } {-random | -file filename}[-iat r][-load r][-pksize r][-window n])

Echo will send data to the echo server, which then echoes the same data back as quickly as possible. "-data r" specifies the amount of data to transfer (in bytes). Note that the count is performed when data is received, so whenever "n" data is received from the server, transfer stops. There will be some data still in transit at this point, which will be lost. "-time r" is the time to transfer data (in seconds). "-random" specifies that random binary data will be used. "-file filename" indicates that data from a file "filename" will be used. "-iat r" is the inter-arrival time, which is the time to wait from the finish of one transfer before starting a new transfer (in seconds). The default is 0 seconds. "-load r" is not yet supported. "-pksize r" specifies the packet size (in bytes), which is the amount of data sent to the TCP layer in a single "send" call. If not specified, a default of 512 bytes is used. Note that the various network layers might further fragment or pool these packets into other packets of varying size. "-window n" specifies a sliding window size (in bytes), which is the maximum amount of data sent before expecting a reply from server. If not specified, a default of 2048 bytes will be used.

At least one of -data or -time must be specified to control the transfer. Both -data and -time can be specified, in which case the first to expire will end the transfer (either the time has elapsed, or "r" data has been transferred). Also, at least one of -random or -file must be specified, but not both.

"Delay Echo Client" has the following format:

(delay_echo -data r -delay r{-random | -file filename}[-iat r][-load n][-pksize n])

Delay echo will send a specified amount of data to the delay echo server, which will collect it. When all data has been transferred to the server, the server will wait for the specified delay period, and then send all the data back. Here, "-data r" is the amount of data to transfer (in bytes). "-delay r" is the time to keep data on the server before sending it back, which is used to let the mobile go dormant before data is returned. "-random" specifies that random binary data will be used. "-file filename" specifies that data from a file "filename" will be used. "-iat r" is the inter-arrival time, which is the time to wait from the finish of one transfer before starting a new transfer (in seconds). The default is 0 seconds. "-pksize r" is the packet size (in bytes), which is the amount of data sent to the TCP layer in a single "send" call. If not specified, a default of 512 bytes is used. Again, it should be noted that the various network layers might further fragment or pool these packets into other packets of varying size.

"Max Client" has the following format:

(max{-data r | -time r}[-iat r][-load n][-pksize n][-dlonly])

Max client will both send and receive independent streams of random binary data in both the transmission and reception directions, as quickly as possible. Here, "-data r" is the amount of data to transfer (in bytes). Note that the count is performed when data is received, so whenever "n" data is received from the server, transfer stops. "-time r" specifies the time to transfer data (in seconds). "-iat r" is the inter-arrival time, which is the time to wait from the finish of one transfer before starting a new transfer (in seconds). The default is 0 seconds. "-pksize r" is the packet size (in bytes), which is the amount of data sent to the TCP layer in a single "send" call. If not specified, a default of 512 bytes is used. "-dlonly" specifies receive data only, e.g., no data will be transmitted. This is supported only in PDLG 1.04-010 or newer. At least one of -data or -time must be specified to control the transfer. Both -data and -time can be specified, in which case the first to expire will end the transfer (either the time has elapsed, or "r" data has been received).

"Ping Client" has the following format:

(ping[-iat r][-repeat r][-pksize r])

Ping client will send a specified number of ICMP ping packets to the destination host, with a specified amount of data, and report the RTT for each. "-iat r" is the inter-arrival time, which is the time to wait before starting a next block of pings. The default is zero seconds. "-repeat r" is the number of pings in each block, with a default of 1. "-pksize r" is the packet size, for the amount of data sent in the ICMP packet in bytes, from 0-1024 bytes. The default is 0 bytes.

"FTP Client" has the following format:

(ftp{-download filename | -upload filename}[-iat r][-passive])

FTP client performs FTP downloads and uploads. "-download filename" specifies the file to download. The file will be first uploaded to the server via LAN, and then downloaded repeatedly through the PPP connection. "-upload filename" specifies the file to upload. "-iat r" is the inter-arrival time, which is the time to wait between transfers. The default is 0 seconds. "-passive" specifies that the PASV mode is used to transfer files instead of PORT mode. At least one of -download and -upload must be specified. If both are specified, first a file is downloaded, then a file is uploaded, and then the client sleeps for "iat" seconds before repeating. Note that the files can be different and have different sizes.

At Step 210, the PDLG script 132 accesses a "mobile configuration" file. This file contains information relating to the wireless cards' interface, their IP addresses, and their user names. A sample mobile configuration file is given below, for the first four wireless cards (index numbers 100-103):

```
[pdlg@2e1evdo5 conf]$ cat conf.mobiles

# labindex mobiletype device serverip options

100 qcp 1960-3G1x /dev/ttyUSB0 xxx.x.xx.100   -chatscript 3g1x
                                              -pppdopts 3g1x
                                              -pppduser PDLG0634
101 qcp1960-3G1x /dev/ttyUSB2 xxx.x.xx.101    -chatscript 3g1x
                                              -pppdopts 3g1x
                                              -pppduser PDLG0635
102 qcp1960-3G1x /dev/ttyUSB4 xxx.x.xx.102    -chatscript 3g1x
                                              -pppdopts 3g1x
                                              -pppduser PDLG0636
103 qcp1960-3G1x /dev/ttyUSB6 xxx.x.xx.103    -chatscript 3g1x
                                              -pppdopts 3g1x
                                              -pppduser PDLG0637 ...
```

As can be seen, each listing in this file includes a wireless card index, the modem serial port (e.g., "/dev/ttyUSB0"), and a destination IP address (e.g., ("xxx.x.xx.100", wherein "x" represents a designated Arabic numeral).

At Step 212, the PDLG script 132 accesses the sessions file 136. At Step 214, the PDLG script 132 creates a PPPD file associated with each wireless card according to the information in the sessions file 136. "PPPD" refers to the point-to-point protocol daemon used to manage network connections between two nodes on Unix-like operating systems (e.g., Linux). A PPPD is configured using command-line arguments and configuration files. Here, therefore, each PPPD file contains a listing of commands/arguments, which may reference one or more of the aforementioned configuration files, for managing a network connection between a designated one of the wireless cards 110 and the PDLG server 70. Information in the PPPD file specific to the designated wireless card is derived from the entry in the sessions file relating to that wireless card, and possibly from the other configuration files such as the mobile configuration file.

The PDLG master script creates a PPPD file for each individual wireless interface card. A sample PPPD file is as follows:

```
[root@2e1evdo3 peers]# pwd
/etc/ppp/peers
[root@2e1evdo3 peers]# cat ttyUSB0
modem
noauth
usepeerdns
show-password
crtscts
deflate 0
nobsdcomp
debug
nodetach
persist
holdoff 30
maxfail 100
user PDLG0621
115200
/dev/ttyUSB0
ipparam xxx.x.xx.xx
connect "/usr/sbin/chat -v -s -S -f /usr/local/pdlg/pdlg/conf/
chat_script_3g1x"
[root@2e1evdo3 peers]# cat /usr/local/pdlg/pdlg/conf/chat_script_3g1x
ABORT 'NO DIALTONE'
TIMEOUT 30
REPORT CONNECT ABORT BUSY ABORT ERROR " AT OK
AT!SWI=97 OK
AT!NV=408,43,00 OK ATE0V1&F&D2&C1&C2S0=0 OK ATE0V1
OK ATS7=60
OK ATDT#777 CONNECT
[root@2e1evdo3 peers]#
```

At Step 214, the PDLG script 132 carries out one or more pre-session tasks, such as uploading any necessary files to the server 70 before making calls, e.g., the file to be transferred from the server to the client 82. At Step 216, the PDLG script 132 invokes the PPPD files, for initiating operation of the wireless cards 110 for making data calls. For invoking the PPPD files, the PDLG script 132 may execute a sub-routine or other program configured for this purpose. In a typical case, once a PPPD is invoked for controlling a designated wireless card, it sets the parameters of the wireless card's serial modem port (e.g., "ttyUSB0"), such as speed. Then, it runs an external "chat" program to establish the connection, which sends the connection command to the wireless card modem. The chat program waits for a "connect" acknowledgement from the serial port. Receipt of an acknowledgement indicates that a connection has been established. At that point, the PPPD program takes over again. If the connection could not be established, the PPPD will exit and return an error. Otherwise, it will communicate with the PPPD on the other end of the connection.

In the example given above, the system uses a chat program referred to as "chat_script_3g1x" to make calls. See, e.g., the sample mobile configuration file. A sample "chat_script_3g1x" file is as follows:

```
[pdlg@2e1evdo5 conf]$ cat chat_script_3g1x
ABORT 'NO DIALTONE'
TIMEOUT 30
REPORT CONNECT ABORT BUSY ABORT ERROR " AT OK
AT!SWI=97 OK
AT!NV=10,00,04,00 OK AT!NV=562,00,00 OK AT!STATUS OK
AT!ESN? OK
ATE0V1&F&D2&C1&C2S0=0 OK ATE0V1 OK ATS7=60 OK
ATDT#777
CONNECT
```

At Step 218, the PDLG script 132 initiates the transfer of data over the communications established in Step 216, for establishing a call load. For doing so, different subroutines may be invoked depending on the type of data transfer, e.g., FTP, echo, http, and UDP. At Step 220, the PDLG script 132 generates one or more intermediate reports relating to the data transfer. At Step 222, after the designated run time, the communications are deactivated, and the PDLG script 132 carries out one or more standard "clean up" or housekeeping operations, such as deleting the PPPD files.

The scripts and programs described above are exemplary only, and may be modified and revised as needed using standard Linux programming methods. Similarly, and other control functions noted above, for which sample scripts/programs are not provided, can be implemented using existing standard Linux programs and/or standard programming methods.

Since certain changes may be made in the above-described packet data load generator system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A method for communicating over a wireless network, said method comprising the steps of:
    establishing a plurality of discrete communication links between a terminal and the wireless network, said communication links being respectively established through a plurality of wireless units directly interfaced with the terminal; and transferring packet data between the terminal and the wireless network over said communication links;
    wherein the wireless units are directly interfaced with a local bus of the terminal;
    wherein there are at least ten wireless units directly interfaced with the local bus of the terminal; and
    wherein the wireless network is a 1x-EVDO (Evolution Data Optimized) wireless network, the communication links are 1x-EVDO data channels, and the wireless units are 1x-EVDO wireless interface cards.

2. The method of claim 1 further comprising:
    monitoring operation of a packet data load generator in place on the wireless network during transfer of said packet data.

3. A method for testing a packet data load generator in a wireless network, said method comprising the steps of:
    establishing a plurality of discrete simultaneous communication links between a plurality of wireless units and a wireless network, said wireless units being directly interfaced with a terminal; and
    monitoring operation of the packet data load generator during transfer of packet data between the terminal and the wireless network over said communication links;
    wherein:
    there are at least ten wireless units directly interfaced with a local bus of the terminal; and the wireless network is a 1x-EVDO (Evolution Data Optimized) wireless network, the communication links are 1x-EVDO data channels, and the wireless units are 1x-EVDO wireless interface cards.

4. A wireless communication system comprising:
a first terminal; and
a plurality of wireless units directly interfaced with the first terminal, each of said wireless units being configured to maintain a discrete communication link over a wireless network;
wherein the first terminal is configured to control the wireless units for the simultaneous transmission and/or reception of packet data over said discrete communication links
wherein the wireless network is a 1x-EVDO (Evolution Data Optimized) wireless network, the communication links are 1x-EVDO data channels, and the wireless units are 1x-EVDO wireless interface cards; and
wherein there are at least ten wireless units directly interfaced with the terminal.

5. The system of claim 4 wherein:
the terminal is a computer terminal having a local bus; and
each of said wireless units is a wireless interface card directly interfaced with said local bus.

6. The system of claim 4 wherein:
each of said wireless interface cards has a PCMCIA (Personal Computer Memory Card International Association) connection;
the local bus is a PCI (Peripheral Component Interconnect) bus having a plurality of expansion slots; and
the system further comprises a plurality of adapters respectively attached to the expansion slots, each of said adapters having a PCI connector attached to the expansion slot and at least two PCMCIA slots electrically connected to the PCI connector, wherein the wireless interface cards are connected to the PCMCIA slots.

7. The system of claim 4 further comprising:
at least one second terminal having an additional plurality of wireless units directly interfaced therewith, each of said additional wireless units being configured for maintaining a discrete communication link over the wireless network;
wherein said at least one second terminal is configured to control the additional wireless units for the simultaneous transmission and/or reception of packet data over said discrete communication links of the additional wireless units.

* * * * *